US006636484B1

(12) United States Patent
Agrawal et al.

(10) Patent No.: US 6,636,484 B1
(45) Date of Patent: *Oct. 21, 2003

(54) AUTOMATIC GENERATION OF OAM CELLS FOR CONNECTION CONTINUITY DETECTION

(75) Inventors: Amit Agrawal, Santa Clara, CA (US); Madhu R. Grandhi, Fremont, CA (US); Madhav V. Marathe, Cupertino, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/208,823

(22) Filed: Dec. 9, 1998

(51) Int. Cl.[7] .............................................. H04S 12/28
(52) U.S. Cl. ...................................................... 370/248
(58) Field of Search ............................. 370/224, 236.2, 370/242, 249, 241.1, 241, 250, 253, 351, 395.1, 397, 399, 409, 248; 379/5

(56) References Cited

U.S. PATENT DOCUMENTS

| | | | | |
|---|---|---|---|---|
| 4,455,644 A | * | 6/1984 | Fox et al. ..................... | 370/243 |
| 4,471,480 A | * | 9/1984 | Haussmann et al. ........ | 370/242 |
| 4,633,246 A | * | 12/1986 | Jones et al. ............ | 340/825.02 |
| 4,841,560 A | * | 6/1989 | Chan et al. ..................... | 379/22 |
| 5,278,977 A | * | 1/1994 | Spencer et al. ............. | 370/228 |
| 5,337,307 A | | 8/1994 | Sato et al. | |
| 5,634,097 A | | 5/1997 | Ashi et al. | |
| 5,648,965 A | | 7/1997 | Thadani et al. | |
| 5,659,540 A | * | 8/1997 | Chen et al. .................. | 370/249 |
| 5,710,760 A | * | 1/1998 | Moll .......................... | 370/249 |
| 5,812,528 A | * | 9/1998 | VanDervort ................. | 370/235 |
| 5,864,555 A | * | 1/1999 | Mathur et al. ........... | 370/236.2 |

(List continued on next page.)

OTHER PUBLICATIONS

The ATM Forum Technical Committee, "Private Network–Network Interface Specification Version 1.0 Addendum (Soft PVC MIB)," ATM Forum document No. af–p-nni–0066.000, pp. 1–18 (Sep. 1996).
The ATM Forum Technical Committee, "Private Network–Network Interface (PNNI) Version 2.0 Living List," ATM Forum document No. LTD–CS–RA–PNNI–02.03, pp. 1–11 and 69–84 (Jul. 1998).
"ATM Routing," ESP 2.0 Installation and Operation, Chapter 4, pp. 4–1 through 4–14, www.cisco.com, Cisco Systems, Inc. (date before Jun. 30, 1999).
"Asynchronous Transfer Mode (ATM) Switching," Internetworking Technology Overview, Chapter 21, pp. 21–7 through 21–12 (date before Jun. 30, 1999).
"Asynchronous Transfer Mode (ATM) Switching," Telecommunications Information, p. 1, www.ee.umanitoba.ca/~blight/telecom.html (Jun. 17, 1999).
"The ATM Cell," ATM Cell, pp. 1–2, http://ganges.cs.tcd.ie/4ba2/atm/ATMCell.html (Jun. 17, 1999).
The ATM Forum Technical Committee, "Private Network–Network Interface (PNNI) Version 2.0 Living List," ATM Forum Document No. LTD–PNNI–2.00, pp. 1–4, 12, and 89–98 (Dec. 1997).

*Primary Examiner*—Wellington Chin
*Assistant Examiner*—William Schultz
(74) *Attorney, Agent, or Firm*—Blakely, Sokoloff, Taylor & Zafman LLP

(57) ABSTRACT

An asynchronous transfer mode (ATM) switch is configured to automatically generate Operations, Administration and Management (OAM) cells for a loopback test at a first connection whenever the first connection is not receiving user data traffic. The ATM switch may include a switch management module which generates the OAM cells that are transmitted from the first connection whenever a control processor initiates the loopback test.

42 Claims, 6 Drawing Sheets

U.S. PATENT DOCUMENTS 5,872,770 A  *  2/1999  Park et al. ................ 370/241.1
5,898,669 A  *  4/1999  Shimony et al. ............ 370/232
5,901,141 A     5/1999  Gruber et al.
6,023,455 A  *  2/2000  Takahashi ................... 370/249
6,049,542 A     4/2000  Prasad
6,222,820 B1 *  4/2001  Hamami ..................... 370/218
6,272,107 B1 *  8/2001  Rochberger et al. ........ 370/216

* cited by examiner

AUTOMATIC GENERATION OF OAM CELLS FOR CONNECTION CONTINUITY DETECTION

FIELD OF THE INVENTION

The present invention relates to the field of computer and other networks; more particularly, the present invention relates to loopback cells for connection continuity detection within such networks.

BACKGROUND OF THE INVENTION

Asynchronous Transfer Mode (ATM) or "cell switching" is a method of transmitting digital information wherein the information is broken into equal sized units called "cells." The individual cells of information are transmitted from a source node to a destination node through a "connection". A connection, such as a Virtual Channel Connection (VCC), is a pathway through a digital network. A digital network is constructed of digital switches coupled together by digital communication links.

Each cell originates at a source node and is transmitted across the communication links. The communication links carry the cells of information between the digital switches along the VCC pathways. The digital switches route the cells from incoming communication links to outgoing communication links using connection routing tables. The routing tables receive cell addresses from an input VCC and are pre-programmed to map the cell to the appropriate output VCC using the cell address. The cell is subsequently transmitted to a destination node over the output VCC. Each digital switch can be connected to several communication links. Furthermore, each communication link can carry several different VCCs simultaneously.

FIG. 1 illustrates an exemplary digital switch node 100. Switch node 100 includes control processor 110, switch fabric 115, and interface modules 120 and 130. Switch node 100 relays ATM cells from its input ports to the appropriate output ports. Each port of switch node 100 is coupled to a communication link. Each communication link carries a multitude of VCCs.

Control processor 110 is configured to establish, modify and terminate virtual path connections coupled to switch node 100. Interface modules 120 and 130 receive ATM cells at ports of switch node 100 via VCCs. The interface modules also transmit cells to VCCs via the ports of switch node 100. Interface modules 120 and 130 include routing tables 123 and 133, respectively, for routing incoming cells to other switches. Although routing tables 123 and 133 are shown as independent entities, they may be components of a single routing table and need not be physically located on-board interface modules 120 and 130.

In a complex cell switching network, there are instances when the routing tables in the path of a connection may be misprogrammed. If a routing table is misprogrammed a discontinuity in a VCC path may be caused in one or both directions. Currently, a problem with discontinuous VCC paths can only be detected by end customers. The end customer must subsequently report the continuity problems to the service provider.

Upon learning of a continuity problem, the service provider must trace the path of the VCC to determine the location of the problem. A common method of determining the location of a problem is to connect to a digital switch with a network manager. As illustrated in FIG. 1, switch node 100 is coupled to network manager 180. One of the functions of network manager 180 is to communicate with control processor 110 in order to update routing tables 123 and 133. However, in the case, of misprogrammed routing tables, it may be necessary to ascertain which routing table and which entry in the routing table is misprogrammed.

Currently, continuity problems can not be detected before a network customer notices an outage. Thus, in order to determine the source of a continuity problem each connection or port must be manually placed in loopback mode. Consequently, network manager 180 must initiate the generation of Operations, Administration and Maintenance (OAM) loopback cells. After initiation by the network manager, OAM loopback cells are generated; for example at the interface modules, and transmitted over each connection until the misprogrammed path is found. Included in each OAM cell is a field that identifies the switch that generated the cell.

As the name implies, a loopback test involves the transmission of OAM cells between switches (or the nodes) of a network in a loop fashion, so that cells transmitted by a particular switch on a particular VCC are ultimately returned to that switch. Thus, if a transmitted OAM cell is received back at switch node 100, one can surmise that the particular connection on which the OAM cell was transmitted is operating without a discontinuity. However, if the OAM loopback cells are not received back at the digital switch, one can surmise there is a continuity problem with the VCC path. In the case where a misprogrammed routing table is involved, multiple switches may need to be tested before the source of the problem is located.

One problem with such manually initiated loopback tests is that a service provider must take a connection or port out of service while the test is being conducted. Accordingly, user traffic cannot flow on the connection. Often, a provider is not able to trace a problem after taking a single port out of service and it is not uncommon for a provider to have to take multiple connections or ports out of service in order to diagnose a particular problem. Further, since each switch may contain thousands of connections, it is not feasible to manually inspect each connection. Thus, in a complex cell switching network, manually testing each connection out of service is a very time consuming and error prone procedure.

SUMMARY OF THE INVENTION

An asynchronous transfer mode (ATM) switch is configured to automatically generate Operations, Administration and Management (OAM) cells for a loopback test at a first port whenever the first port is not receiving user data traffic from a first virtual connection associated with the first port. The ATM switch may include a switch management module which generates the OAM cells that are transmitted from the first port over the first virtual connection whenever a control processor initiates the loopback test.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are provided as examples for explanation and understanding only.

DETAILED DESCRIPTION

Figure 1:
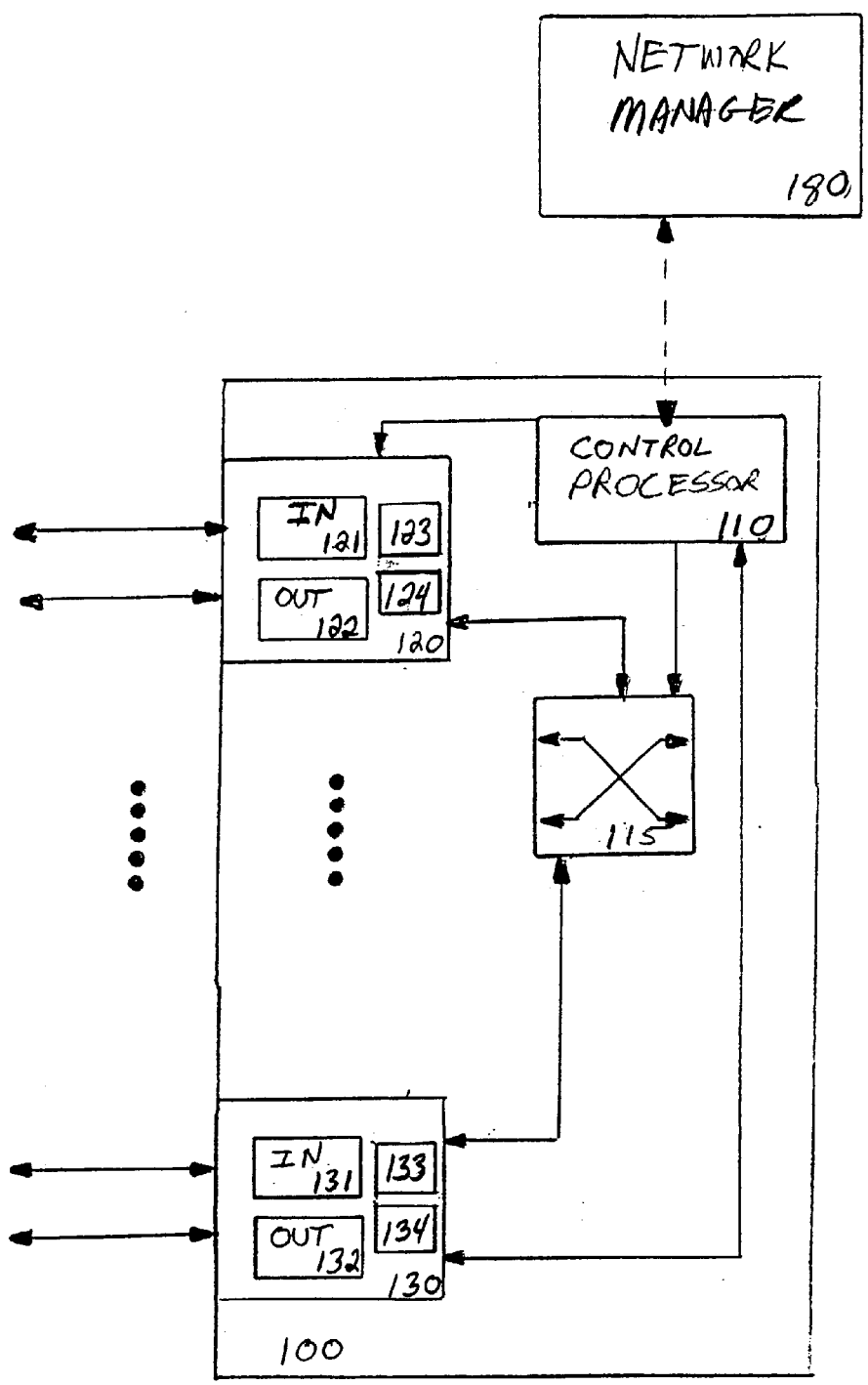
FIG. 1 illustrates a conventional ATM switch.
Figure 2:
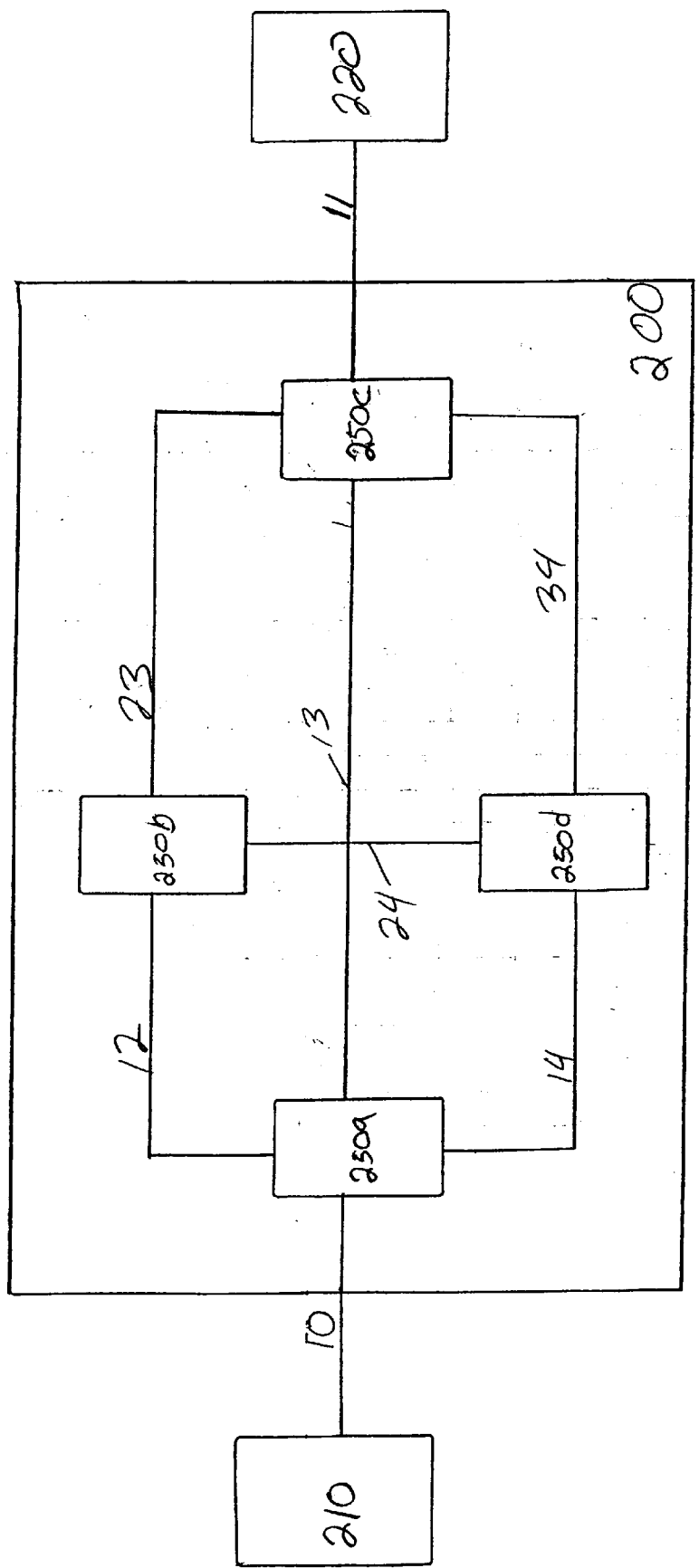
FIG. 2 illustrates an ATM network having nodes configured in accordance with the present invention.

FIG. 2 illustrates an exemplary ATM network 200 having nodes configured in accordance with the present invention. ATM network 200 is constructed of digital switch nodes that are capable of building virtual circuits for routing ATM cells. ATM network 200 includes four digital switch nodes 250a, 250b, 250c and 250d. Of course, this is merely an example and, in practice, a network such as ATM network 200 or other cell or packet switched networks may be made up of a hundreds of switches. Each switch node is coupled to each of the other switch nodes by one or more communication links. Each communication link is capable of carrying a number of Virtual Channel Connections (VCCs). VCCs provide a means of bi-directional transport of ATM cells between switch nodes. Each VCC is assigned a Virtual Channel Identifier (VCI) for identification purposes.

Switch node 250a is coupled to switch nodes 250b, 250c and 250d by communication links 12, 13 and 14, respectively. Switch node 250b is coupled to switch nodes 250c and 250d by communication links 23 and 24, respectively. Switch node 250c is coupled to switch node 250d by communication link 34. The VCCs transported by the links connecting the switch nodes are Permanent Virtual Connections (PVCs). PVCs are dedicated connections configured by an ATM network provider which remain established thereafter. Alternatively, the VCCs coupling the digital switch nodes may be Switched Virtual Circuits (SVCs). An SVC is a connection that is established automatically on a call-by-call basis.

End nodes 210 and 220 are coupled to network 200. In particular, end node 210 is coupled to switch node 250a via communication link 10 and end node 220 is coupled to switch node 250c via communication link 11. End nodes 210 and 220 may be Customer Premises Equipment (CPE) that consist of any type of digital communication equipment such as a Private Branch Exchange (PBX) or a packet router. The interface between the switches and end nodes is typically referred to as a user-network interface (UNI). Each end node generates and transmits ATM cell payloads that are to be received by the other end node. For example, end node 210 generates and transmits ATM cells that are to be received by end node 220, and vice versa. One of ordinary skill in the art will appreciate that additional end nodes may be added to network 200.

Figure 5:
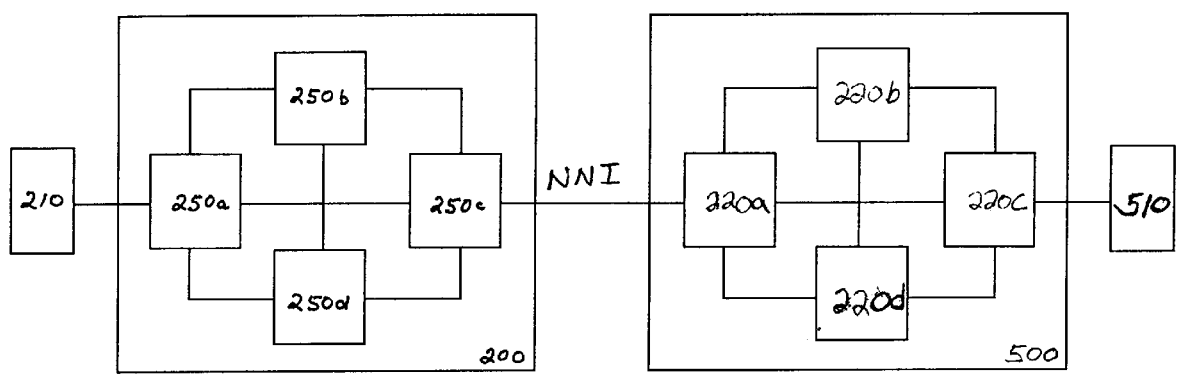
FIG. 5 illustrates multiple ATM networks coupled in accordance with the present invention.

Alternatively, either or both end nodes 210 and 220 may be switch nodes associated with other networks. For example, FIG. 5 illustrates an embodiment in which ATM network 200 is coupled to an ATM network 500. ATM networks 200 and 500 are coupled by switch nodes 250c and 220a, respectively. ATM network 500 is also coupled to end node 510. The connection between switch nodes 250c and 220a is typically referred to as a network-node interface (NNI).

Referring to FIG. 2, if a user at end node 210 wishes to establish a connection with end node 220, a call setup message from end node 210 is delivered to switch node 250a using a VCC transported by communication link 10. When the signaling request is received, switch node 250a determines whether a path through network 200 can be established. If no route can be found, then the call is blocked (cleared). If a path is found, a designated transit list (DTL) is created for downstream nodes to follow and the cell is forwarded along the route.

To determine whether a path exists that will satisfy the call request pre-computed routing tables are used. The routing tables are stored at switch 250a to determine whether such a route can be established. The routing tables are pre-computed to determine a path to end node 220. For network 200, a connection point from switch node 250a to switch node 250c may be the shortest path to end node 120 under some operating conditions. If for some reason switch node 250c rejects the call request, an alternate route through switch node 250b or 250d may be provided. Once the connection is established between end node 210 and 220, ATM cells are exchanged.

Figure 3:
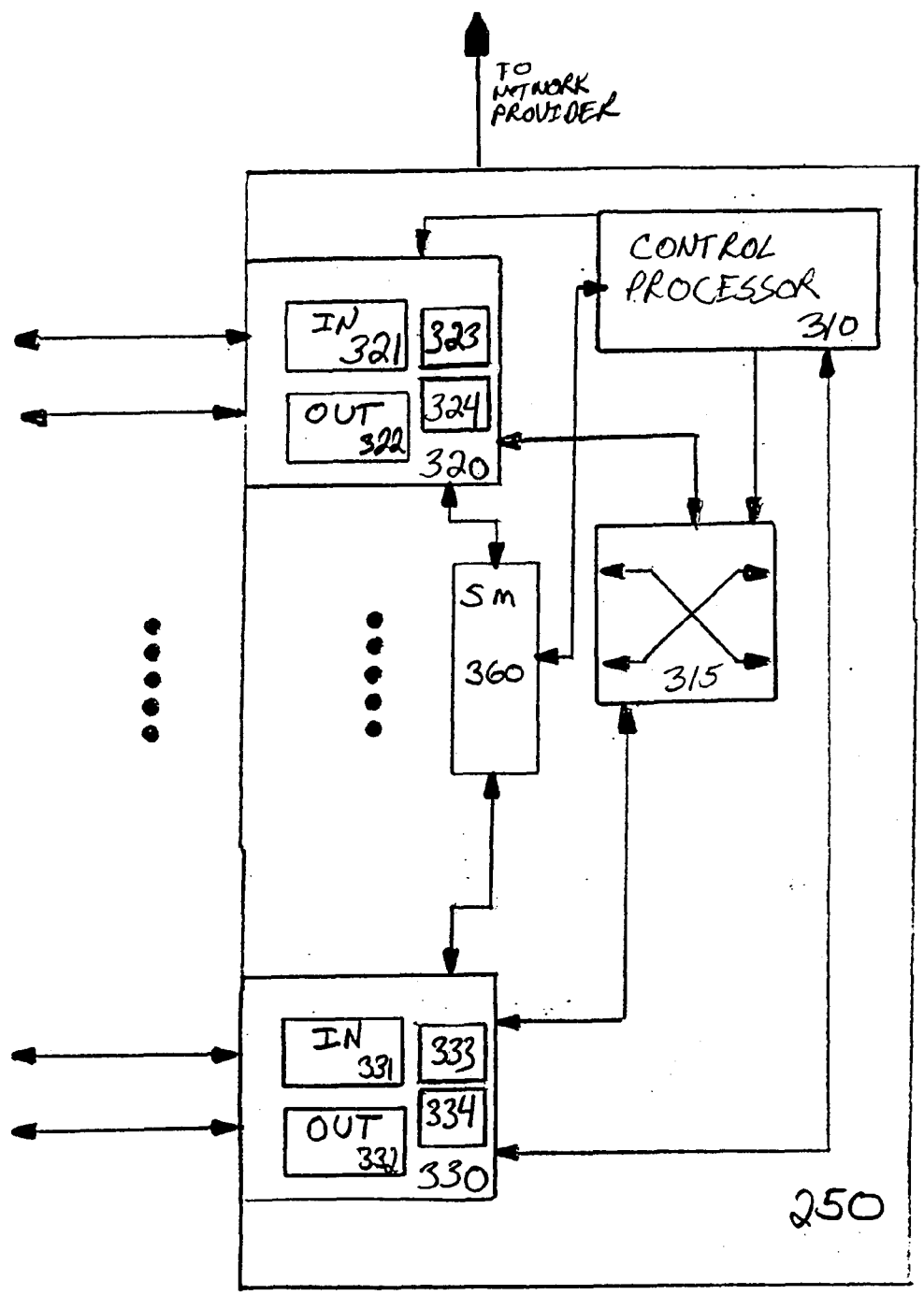
FIG. 3 illustrates a digital switch node configured in accordance with the present invention.

FIG. 3 illustrates a digital switch node 250 configured in accordance with the present invention. Switch node 250, which may resemble any or all of switch nodes 250a–250d, includes control processor 310, switch fabric 315, and interface modules 320 and 330. Switch node 250 relays ATM cells from its input ports to the appropriate output ports. Each port of switch node 250 is coupled to a communication link. As described above, each communication link carries a multitude of VCCs, such as PVCs or SVCs, for bi-directional transport of ATM cells in and out of switch node 250. Further, each VCC connection at switch node 250 is associated with an assigned VCI.

Control processor 310 is configured to establish, modify and terminate virtual path connections coupled to switch node 250. Control processor 310 receives cells from the interface modules, interprets them and performs admission decisions and resource allocation decisions for all connections through switch node 250. Further, control processor 310 keeps a log of all transactions that are executed at switch node 250 (e.g., source information, destination information, VCIs, etc.). According to one embodiment, control processor 310 also initiates the automatic generation of OAM cells for loopback tests. Switch fabric 315 transfers cells between interface modules 320 and 330. In addition, switch fabric 315 may be configured to buffer cells and conduct traffic concentration and multiplexing.

Interface modules 320 and 330 transmit and receive ATM cells at ports of switch node 250 via VCCs. Note that only two interface modules are described in the current embodiment in order to simplify the description of switch node 250. Nevertheless, one of ordinary skill in the art will recognize that switch node 250 may include many interface modules. Interface modules 320 and 330 include input buffers 321 and 331, respectively. Input buffers 321 and 331 queues for cells that arrive at switch node 250. Interface modules 320 and 330 also include output buffers 322 and 332, respectively. Output buffers 322 and 332 queues for cells to be transmitted from switch node 250.

Interface modules 320 and 330 further include routing tables 323 and 333, respectively. Routing tables 323 and 333 provide information about the connections of switch node 250. Although shown as independent entries, routing tables 323 and 333 may be parts of a single routing table and need not be physically located at the interface modules. For example, the routing table may be stored in a memory shared by each of the interface modules. As cells are received at switch node 250, the interface modules extract an address from the cell that provides information that is used to transport the cell. Routing tables 323 and 333 map the incoming port and address to an outgoing port and address for cells of each connection received at interface modules 320 and 330, respectively. Interface processors 324 and 334 are also included within interface modules 320 and 330, respectively, in order to control the operations (e.g., queuing and scheduling operations) of the interface modules.

Switch node 250 further includes switch manager 360. Switch manager 360 performs fault management, performance management and other administration functions for switch node 250. According to one embodiment, switch manager 360 generates loopback OAM cells that are transmitted to the interface modules upon instruction by control processor 310. In an alternative embodiment, switch manager 360 may be a process of control processor 310.

Switch node 250 is configured to automatically generate OAM loopback cells on VCCs that are not currently receiving cell traffic via network 200. While receiving data cell traffic from network 200, switch node 250 receives and transmits ATM cells at the interface modules. For example, interface module 320 receives ATM cells over connected ports. Cells are stored in input buffer 321 until they are ready to be switched to an interface module associated with the appropriate output ports via switch fabric 315.

Once the cell is ready to be processed, address and input port information (including the VCI) is examined with reference to routing table 323. If the output port to which the cell is to be transmitted is located at interface module 320, the cell is transmitted to output buffer 322 before being transmitted over the applicable VCC. However, if the output port is not located at interface module 322, the cell is routed through switch fabric 315. Switch fabric 315 routes the cell to another interface module (e.g., interface module 330) where it is stored (e.g., at output buffer 322) before being transmitted.

As discussed above, control processor 310 keeps a log of all transactions that are executed at switch node 250. According to one embodiment, control processor 310 is configured to search the transaction log to determine whether the log contains recent entries with a particular VCI. The transaction log may be implemented using a counter that keeps track of the number of transactions carried out on each VCC. If the log contains the particular VCI entries, control processor 310 recognizes that the corresponding VCC is receiving data cell traffic. Since the VCC is receiving data traffic it is at least operating properly in the incoming direction. Consequently, it is not necessary to initiate an OAM loopback test. If the VCC is not operating in the outgoing direction, that error will be detected at another switch node that has initiated a separate loopback test.

If there are no entries in the log with the particular VCI, control processor 310 recognizes that cell traffic has not been recently received on the corresponding VCC. Therefore control processor 310 initiates an OAM loopback test for that VCC. Upon recognizing that a loopback test must be conducted, control processor 310 transmits a signal to switch manager 360 in order to initiate a loopback test. Switch manager 360 generates one or more OAM cells and transmits them on the applicable VCC (e.g., by causing the cells to be injected into the output buffers of the appropriate interface module associated with the VCC under the test).

Figure 6:
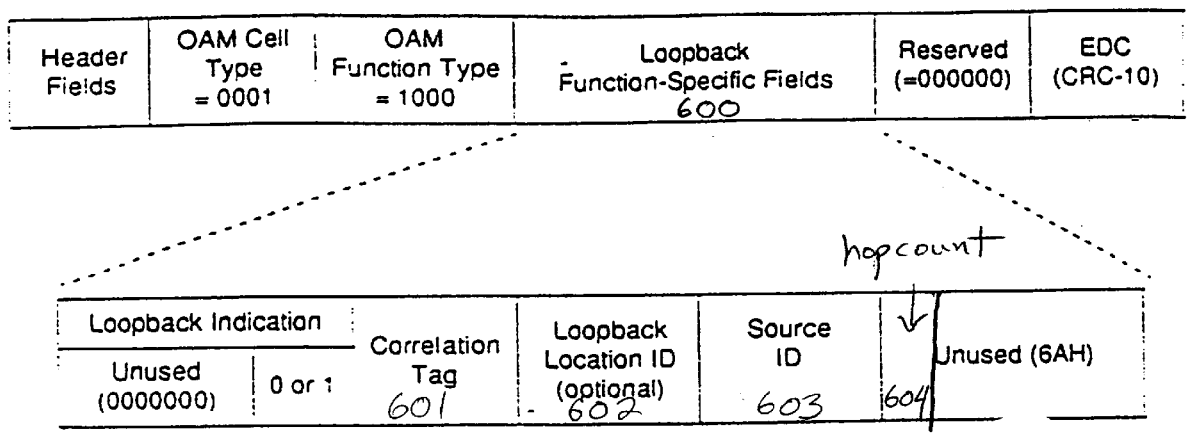
FIG. 6 illustrates an Operations, Administrations and Maintenance (OAM) cell configuration accordance with one embodiment of the present invention.

FIG. 6 illustrates an OAM cell configuration in accordance with one embodiment of the present invention. The OAM cells include loopback function-specific fields 600. Each field 600 includes sub-fields that are used to carry out loopback tests. For example, the OAM cells contain a Source ID 603 that identifies the cells as being initiated from switch node 250, and a Correlation Tag 601 that specifies that the cells belong to the automatic loopback test protocol. The OAM cells are stored in the output buffer of the interface module before being transmitted on the VCC. The OAM cells are transmitted through network 200 until it reaches the endpoint switch node of the VCC. The endpoint switch node subsequently transmits the OAM cells back through network 200 on the same VCC to switch node 250, where the OAM cells are identified by the source ID 603 and Correlation Tag 601.

According to one embodiment, OAM loopback cells are transmitted over inactive connections at a fixed rate, for example 1 per second. This generation rate may be slowed down or otherwise altered based on the number of connections to be tested. According to a further embodiment, the cell generation rate may be fixed, configurable or adaptive. For example, control processor 310 may be programmed to cause OAM cells to be generated at a predetermined rate, which may be dynamically modified by a network manager or according to traffic conditions.

An OAM loopback cell is transmitted to other switch nodes in network 200 along the VCC path. The loopback cell reaches an endpoint switch node after having been switched through network 200. As described above, the network endpoint may be configured as a UNI or an NNI. If the endpoint node is configured as a UNI, the endpoint node extracts the cell, clears a loopback indication bit and transmits the cell in the opposite direction on the same VCC.

If the endpoint node is configured as an NNI as shown in FIG. 5, the endpoint node passes the cell to network 500 without modification. If switch node 220a of network 500 does not support the automatic loopback OAM cells, it simply recognizes the cell as a standard loopback cell. Thus, switch node 220a extracts the cell, clears the loopback identification bit and sends the cell in the opposite direction (i.e., back towards network 200). If switch node 220a does support the automatic loopback OAM cells, it passes the cell onto the VCC without modification The loopback cell may be switched through a multitude of NNIs and networks belonging to several service providers before arriving at an endpoint node that is configured as an UNI.

On the return path, the loopback cell arrives at switch node 220a (i.e., the NNI switch node). Switch node 220a determines whether it was the originator of the loopback cell by examining Source ID 603. If it is determined that the cell was originated at switch node 220a, the cell is extracted and the loopback test is considered to have passed for the particular VCC. If the loopback cell was not originated at switch node 220a, the cell is passed to network 200 without modification.

If the entire VCC path is programmed properly, at least one loopback cell will be received back at switch node 250. Switch node 250 extracts the loopback cells and matches the source ID 603 to verify that the cell was originally transmitted by switch node 250 on the particular VCC. If the loopback cells are not received back at switch node 250 within a predetermined period, an alarm signal may be generated by control processor 310 and transmitted to the ATM network provider indicating that the routing table entry for the VCC under test is misprogrammed or the VCC is otherwise suffering from continuity problems.

According to one embodiment, if the OAM loopback cells are not received on the VCC at the initiating switch, the connection is declared failed. According to another embodiment, the OAM loopback cells may be time stamped in the conventional fashion to measure the round trip delay. According to yet a further embodiment, the OAM cells may be looped back from intermediate switches based on a hop counter in the cell (i.e., hop counter 604). The loopback test would then identify the problem switch in addition to the connection discontinuity. In such an embodiment, the hop counter is decremented at each switch node that receives the OAM cell. Once the hop counter in the loopback cell is decremented to zero it is transmitted back to the originating switch node. In another embodiment, the hop counter may be incremented for each node at which the cell is successfully received. Then, if each node returns a copy of the cell, by checking to see which "hop" failed, the problem point in the connection can be established.

Referring back to FIG. 2, an example of the operation of the present invention is described within the context of network 200. If ATM data cells are being transmitted between switch node 250*a* and switch nodes 250*b* and 250*c*, the control processor in switch node 250*a* recognizes that cell traffic has been recently received over VCCs associated with the communication links 12 and 13. In addition, the control processor within switch nodes 250*b* and 250*c* also recognize that data cell traffic has been recently received over these VCCs. Therefore, it is not necessary to generate or transmit OAM loopback cells in either direction of these VCCs.

If ATM data cells are not being transmitted between switch nodes 250*a* and 250*d*, the control processors in each of the switch nodes recognize that no traffic has been recently received over VCCs associated with communication link 14. Consequently, an OAM loopback cell may be generated at either or both switch nodes 250*a* and 250*d*. Switch node 250*a* transmits the loopback cell to switch node 250*d*, while switch node 250*d* transmits the loopback cell to switch node 250*a*. If each switch node receives its respective loopback cell back, there are no problems with the VCCs associated with communication link 14. However, if one or both of the switch nodes does not receive its respective loopback cell back within a predetermined period of time, there is a problem with the programming of the VCCs at either switch node 250*a* or 250*d*, or both. Accordingly, an alarm signal may be transmitted to the ATM network provider.

According to another embodiment, if neither of the switch nodes receives its respective loopback cell back within a predetermined period of time, a second loopback cell is transmitted. If the second loopback cell is not received back within the predetermined period of time, a third loopback cell is transmitted. The switch nodes continue this process until ten (10) loopback cells have been transmitted. If no loopback cells have been received back at a switch after the tenth loopback cell has been transmitted, there is a problem with the programming of the VCCs at one or both switch nodes. According to a further embodiment, the switch nodes may also conduct an OAM loopback test for VCCs associated with end nodes 210 and 220. One of ordinary skill in the art will appreciate that the switch nodes may generate various other quantities of loopback signals (e.g., 2, 3, 4, 5, etc.) before signaling that there is a problem with a VCC.

Figure 4:
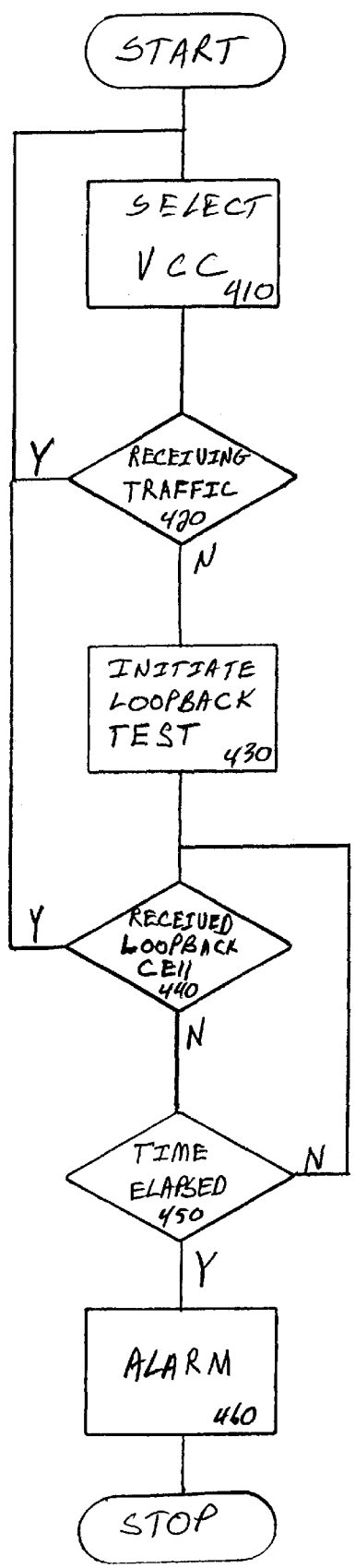
FIG. 4 illustrates a flow diagram of a procedure for automatically generating OAM loopback signals according to one embodiment of the present invention.

FIG. 4 illustrates a flow diagram of a procedure for automatically generating OAM loopback cells according to the present invention. At step 410, control processor 310 selects a VCC in order to search for recent data activity. Next, at step 420, control processor 310 determines whether user data traffic has been recently received at the VCC. If traffic is being received on the selected VCC, control is returned back to step 410 in order to select another VCC. If no traffic has recently been received on the selected VCC, control processor 310 initiates a loopback test such that an OAM loopback cell is transmitted from switch node 250 over the VCC, step 430.

At step 440, switch node 250 determines whether the loopback cell for the selected VCC has been received back. If the loopback cell for the selected VCC has been received, control is returned back to step 410 in order to select another VCC. If the loopback cell for the selected VCC has not been received, it is determined whether a predetermined period of time (which may be configurable depending upon network traffic conditions) has elapsed, step 450. If the time period has not elapsed, control is returned back to step 440 in order to determine whether the loopback cell has been received. If the time period has elapsed, an alarm signal is transmitted to the ATM network provider, step 460.

Thus, an apparatus for the automatic generation of OAM loopback cells has been described.

What is claimed:

1. An asynchronous transfer mode (ATM) switch comprising:
a control processor to search an activity log to determine whether a first connection of the ATM switch has received traffic and to automatically initiate a loopback test at times when said first connection of the ATM switch is not receiving traffic.

2. The ATM switch of claim 1, wherein said loopback test is conducted using Operation, Administration and Management (OAM) cells that are transmitted from said first connection.

3. The ATM switch of claim 1, wherein said control processor automatically initiates an OAM cell loopback test at a second connection of said ATM switch whenever said second connection is not receiving traffic.

4. The ATM switch of claim 2, wherein said control processor includes a switch management module to generate said OAM cells.

5. The ATM switch of claim 3, wherein said control processor searches said activity log to determine whether said second connection has received traffic.

6. The ATM switch of claim 3, further comprising:
a first interface module coupled to said first connection and said control processor;
a second interface module coupled to said second connection and said control processor; and
a switch fabric coupled to said first and second interface modules.

7. The ATM switch of claim 2, wherein said loopback test is initiated such that one OAM loopback cell is generated per second at said switch.

8. The ATM switch of claim 2, wherein said loopback test is initiated such that OAM cells are generated at a rate according to traffic conditions within a network associated with said switch.

9. The ATM switch of claim 2, wherein said control processor further generates an alarm signal if said OAM cells are not received within a predetermined time interval.

10. The ATM switch of claim 2, wherein said OAM cells include a hop counter for determining a destination switch.

11. An asynchronous transfer mode (ATM) network comprising:
a first switch coupled to a first communication link; and
a second switch coupled to the first switch via the first communication link;

the first switch to search a first activity log to determine whether a first connection has received traffic and to automatically transmit a first set of Operations, Administration and Management (OAM) cells to the second switch via the first communication link and the second switch to search a second activity log to determine whether a second connection has received traffic and to automatically transmit a second set of OAM cells to the first switch via the first communication link at times when the first and second switches are not exchanging data cells on said first and second virtual connections associated with the first communication link.

12. The ATM network of claim 11, further comprising a first end node coupled to the first switch by a second communication link, the first switch to transmit a third set of OAM cells to the first end node via the second communication link at times when the first switch and the first end node are not exchanging cells on virtual connections associated with the second communication link.

13. The ATM network of claim 12, further comprising a second end node coupled to the second switch by a third communications link, the second switch to transmit a fourth set of OAM cells to the second end node via the third communication link at times when the second switch and the end node are not virtual connections associated with the third communication link.

14. The ATM network of claim 12, wherein the first end node comprises Customer Premises Equipment (CPE).

15. The ATM network of claim 11, wherein the first switch receives the second set of OAM cells from the second switch via the first communication link and transmits the second set of OAM cells back to the second switch via the first communication link.

16. The ATM network of claim 15, wherein the second switch receives the first set of OAM cells from the first switch via the first communication link and transmits the first set of OAM cells back to the first switch via the first communication link.

17. The ATM network of claim 11, wherein at least one of the virtual connections associated with the first communication link comprises a permanent virtual connection (PVC).

18. The ATM network of claim 11, wherein at least one of the virtual connections associated with the first communication link comprises a switched virtual connection (SVC).

19. A method comprising:
searching an activity log to determine whether a first virtual connection within a network has recently received data traffic; and, if not,
automatically initiating a loopback test for the first virtual connection.

20. The method of claim 19, wherein if the first virtual connection has recently received data traffic, searching said activity log to determine whether a second virtual connection within the network has recently received data traffic.

21. The method of claim 19, wherein automatically initiating a loopback test comprises:
generating a first Operations, Administration and Management (OAM) cell at a first node of the network; and
transmitting the first OAM cell from the first node over the first virtual connection.

22. The method of claim 21, further comprising:
determining whether the first OAM cell has been received back at the first node within a predetermined period of time.

23. The method of claim 21, further comprising selecting a second virtual connection for test if the first OAM cell is received within the predetermined period of time.

24. The method of claim 22, further comprising generating an alarm signal if the first OAM cell is not received within the predetermined period of time.

25. The method of claim 21, further comprising:
transmitting a second OAM cell from the first node over the first virtual connection if the first OAM cell is not received within the predetermined period of time;
determining whether the second OAM cell has been received back at the first node within a predetermined period of time; and, if not
generating an alarm signal.

26. The method of claim 25, further comprising selecting a second virtual connection for test if the second OAM cell is received within the predetermined period of time.

27. A system comprising:
means for searching an activity log to determine whether a first virtual connection within a network has recently received data traffic; and, if not,
means for automatically initiating a loopback test for the first virtual connection.

28. The system of claim 27, wherein if the first virtual connection has recently received data traffic, means for searching said activity log to determine whether a second virtual connection within the network has recently received data traffic.

29. The system of claim 27, further comprising:
means for generating a first Operations, Administration and Management (OAM) cell at a first node of the network; and
means for transmitting the first OAM cell from the first node over the first virtual connection.

30. The system of claim 29, further comprising:
means for determining whether the first OAM cell has been received back at the first node within a predetermined period of time.

31. The system of claim 29, further comprising means for selecting a second virtual connection for test if the first OAM cell is received within the predetermined period of time.

32. The system of claim 22, further comprising means for generating an alarm signal if the first OAM cell is not received within the predetermined period of time.

33. The system of claim 29, further comprising:
means for transmitting a second OAM cell from the first node over the first virtual connection if the first OAM cell is not received within the predetermined period of time;
means for determining whether the second OAM cell has been received back at the first node within a predetermined period of time; and, if not means for generating an alarm signal.

34. The system of claim 33, further comprising means for selecting a second virtual connection for test if the second OAM cell is received within the predetermined period of time.

35. A computer readable medium containing executable instructions, which, when executed in a processing system, cause said processing system to perform a method comprising:
searching an activity log to determine whether a first virtual connection within a network has recently received data traffic; and, if not,
automatically initiating a loopback test for the first virtual connection.

36. The computer readable medium of claim 35, wherein said method further comprises, if the first virtual connection has recently received data traffic, searching said activity log to determine whether a second virtual connection within the network has recently received data traffic.

37. The computer readable medium of claim 35, wherein automatically initiating a loopback test further comprises:

generating a first Operations, Administration and Management (OAM) cell at a first node of the network; and transmitting the first OAM cell from the first node over the first virtual connection.

38. The computer readable medium of claim 37, wherein said method further comprises:

determining whether the first OAM cell has been received back at the first node within a predetermined period of time.

39. The computer readable medium of claim 37, wherein said method further comprises selecting a second virtual connection for test if the first OAM cell is received within the predetermined period of time.

40. The computer readable medium of claim 37, wherein said method further comprises generating an alarm signal if the first OAM cell is not received within the predetermined period of time.

41. The computer readable medium of claim 37, wherein said method further comprises:

transmitting a second OAM cell from the first node over the first virtual connection if the first OAM cell is not received within the predetermined period of time;

determining whether the second OAM cell has been received back at the first node within a predetermined period of time; and, if not generating an alarm signal.

42. The computer readable medium of claim 41, wherein said method further comprises selecting a second virtual connection for test if the second OAM cell is received within the predetermined period of time.

* * * * *